United States Patent
Tashiro et al.

(10) Patent No.: US 11,753,000 B2
(45) Date of Patent: Sep. 12, 2023

(54) PARKING ASSISTANCE DEVICE

(71) Applicant: HITACHI AUTOMOTIVE SYSTEMS, LTD., Hitachinaka (JP)

(72) Inventors: Naoyuki Tashiro, Tokyo (JP); Masato Imai, Tokyo (JP); Takashi Tsutsui, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 577 days.

(21) Appl. No.: 16/963,890

(22) PCT Filed: Jan. 8, 2019

(86) PCT No.: PCT/JP2019/000144
§ 371 (c)(1),
(2) Date: Jul. 22, 2020

(87) PCT Pub. No.: WO2019/146392
PCT Pub. Date: Aug. 1, 2019

(65) Prior Publication Data
US 2020/0346639 A1 Nov. 5, 2020

(30) Foreign Application Priority Data
Jan. 23, 2018 (JP) .................. 2018-009161

(51) Int. Cl.
*B60W 30/06* (2006.01)
*B60W 50/14* (2020.01)
(Continued)

(52) U.S. Cl.
CPC ............ *B60W 30/06* (2013.01); *B60W 50/14* (2013.01); *G01C 21/34* (2013.01);
(Continued)

(58) Field of Classification Search
CPC ...... B60W 30/06; B60W 30/08; B60W 50/14; B60W 2510/186; B60W 2510/188;
(Continued)

(56) References Cited

U.S. PATENT DOCUMENTS

2015/0367845 A1\* 12/2015 Sannodo ............... B60W 10/20
701/23
2017/0129538 A1 5/2017 Stefan et al.
(Continued)

FOREIGN PATENT DOCUMENTS

CN 107150720 A \* 9/2017 ............ B60W 30/06
DE 10030449.2 A1 1/2001
(Continued)

OTHER PUBLICATIONS

Hua, Yiding et al. Path Tracking Control of Automatic Parking Cloud Model considering the Influence of Time Delay. Mathematical Problems in Engineering; New York. vol. 2017, 2017. (Year: 2017).\*

(Continued)

*Primary Examiner* — Geepy Pe
*Assistant Examiner* — Daniel Tyler Reich
(74) *Attorney, Agent, or Firm* — Foley & Lardner LLP

(57) ABSTRACT

When there are a plurality of routes to one parking space, automatic parking cannot be performed on a route with short parking time. A route candidate generation unit 301 changes a reference vehicle speed and a route shape, and searches for a route from a parking start position to a parking target position. The route passage time calculation unit 302 calculates, for each route candidate, the time required to pass through the route based on the reference vehicle speed and the length of the route. A state switching time calculation unit 303 calculates, for each route candidate, the time required for switching between forward and backward
(Continued)

movements of a vehicle, and the time required to change steering to a predetermined steering angle in a state where the vehicle is stopped. A route selection processing unit 305 selects a specific route, for example, a route with short parking time, from a generated routes based on route passage time.

18 Claims, 16 Drawing Sheets

(51) Int. Cl.
    *G01C 21/34*     (2006.01)
    *G08G 1/0962*     (2006.01)
    *G08G 1/16*     (2006.01)

(52) U.S. Cl.
    CPC ......... *G08G 1/09626* (2013.01); *G08G 1/168* (2013.01); *B60W 2552/15* (2020.02); *B60W 2554/404* (2020.02); *B60W 2555/20* (2020.02)

(58) Field of Classification Search
    CPC ............... G01C 21/34; G01C 21/3415; G08G 1/09626; G08G 1/168
    USPC ......................................... 701/11, 23, 25, 26
    See application file for complete search history.

(56) References Cited

U.S. PATENT DOCUMENTS

| | | | |
|---|---|---|---|
| 2018/0286240 A1 | 10/2018 | Harai | |
| 2018/0297589 A1* | 10/2018 | Hasejima | ............... B60W 30/06 |
| 2019/0027042 A1* | 1/2019 | Fujishima | ............ G05D 1/0225 |

FOREIGN PATENT DOCUMENTS

| | | |
|---|---|---|
| DE | 10 2016 220 945 A1 | 5/2017 |
| JP | 2006-335239 A | 12/2006 |
| JP | 2011-025752 A | 2/2011 |
| JP | 2013-212773 A | 10/2013 |
| JP | 2013-241087 A | 12/2013 |
| JP | 2015-227785 A | 12/2015 |
| JP | 2016-002957 A | 1/2016 |
| JP | 2017-052434 A | 3/2017 |
| JP | 2017-65455 A | 4/2017 |

OTHER PUBLICATIONS

Satonaka, Hishashi et al. Machine translation of JP 2006335239. "Parking Support Device." Jun. 2, 2005 (filing date). (Year: 2006).*
Stefan, Frederic et al. Machine translation of DE 102016220945. "Method and Device for Supporting a Maneuvering Process of a Motor Vehicle." Oct. 25, 2016 (filing date). (Year: 2017).*
Kuno, Kazuhiro. Machine translation of JP 2011025752. "Drive Support Apparatus and Drive Support Method." Jul. 22, 2009 (filing date). (Year: 2011).*
Hayakawa, Kazutaka. Machine translation of CN 107150720. "Parking Assisting Device." Dec. 20, 2016 (filing date). (Year: 2019).*
Sakai, Katsuhiro. Machine translation of DE 10030449. "Automatic vehicle steering system has speed limiter for limiting vehicle speed to equal to or less than locus curve-dependent vehicle speed limit during control of steering actuator element." Jun. 21, 2000 (filing date). (Year: 2001).*
Satonaka, Hishashi et al. Machine translation of JP 2013241087. "Parking Assist System, Parking Assist Method, Media and Program." May 21, 2012 (filing date). (Year: 2013).*
International Search Report with English translation and Written Opinion issued in corresponding application No. PCT/JP2019/000144 dated Apr. 23, 2019.
German Office Action dated Oct. 12, 2022 issued in corresponding German Application No. 112019000269.4 with English translation.
Office Action issued in corresponding Chinese Patent Application No. 201980005377.7 dated Dec. 2, 2022 (8 pages).

\* cited by examiner

| | ROUTE PASSAGE TIME | STATE SWITCHING TIME | PARKING TIME |
|---|---|---|---|
| ROUTE CANDIDATE 1 | Td(1) | Ts(1) | Tp(1) |
| ROUTE CANDIDATE 2 | Td(2) | Ts(2) | Tp(2) |
| ... | ... | ... | ... |
| ROUTE CANDIDATE N | Td(N) | Ts(N) | Tp(N) |

PARKING ASSISTANCE DEVICE

TECHNICAL FIELD

The present invention relates to a parking assistance device.

BACKGROUND ART

Driving support systems for preventing a traffic accident and reducing a driver's driving load during a traffic jam have been developed. One of the driving support systems is automatic parking. In automatic parking, when a driver designates a target parking frame, part or all of accelerator, brake, and steering operations are automatically performed, and the vehicle is parked in the target parking frame.

Patent Literature 1 discloses, as a function of automatic parking, a technique of presenting parking space, in which parking time, the number of times of turning back of a steering wheel, and the like match with conditions set by a driver, to the driver as recommended parking space.

CITATION LIST

Patent Literature

PTL 1: JP 2017-65455 A

SUMMARY OF INVENTION

Technical Problem

In PTL 1, only one space that matches with a condition set by a user is recommended from a plurality of parking spaces.

Solution to Problem

A parking assistance device according to the present invention includes a route candidate generation unit that changes either one of a reference vehicle speed and a route shape when traveling on a route after a parking target position is selected and generates at least one or more routes from a parking start position to the parking target position, a route passage time calculation unit that calculates route passage time required to pass through the route generated by the route candidate generation unit, and a route selection processing unit that selects a specific route from the generated routes based on the route passage time.

Advantageous Effects of Invention

According to the present invention, when there are a plurality of parking routes to one parking space, automatic parking can be performed by selecting a route with short parking time or a route with a small number of times of turning back of a steering wheel.

DESCRIPTION OF EMBODIMENTS

First Embodiment

Figure 1:
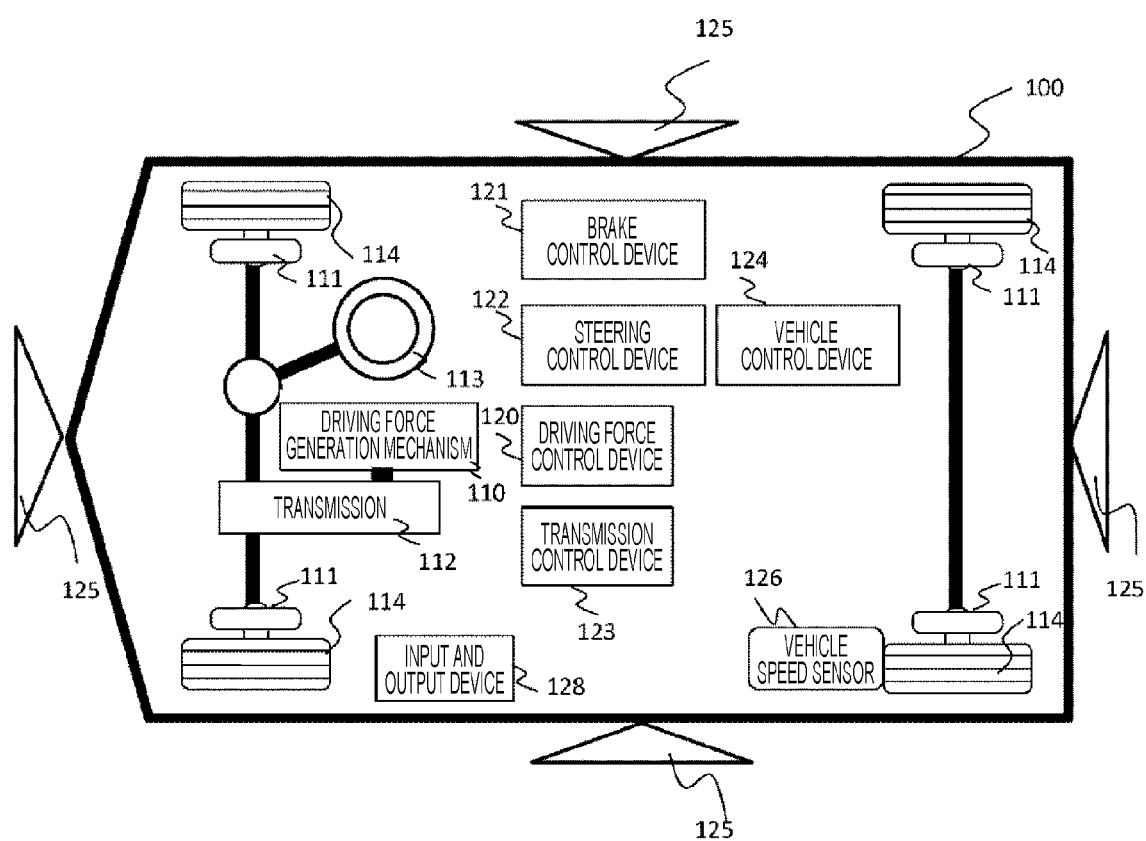
FIG. 1 is a configuration diagram of a vehicle including a vehicle control device equipped with a parking assistance device.

FIG. 1 is a configuration diagram of a vehicle 100 including a vehicle control device 124 equipped with a parking assistance device.

The vehicle 100 includes a driving force generation mechanism 110 as a power source, a brake 111 for braking the vehicle 100, and a transmission 112 having a gear for switching the driving force generated by the driving force generation mechanism 110 to allow forward and backward driving. The driving force of the driving force generation mechanism 110 rotates left and right wheels 114 via the transmission 112 so as to cause the vehicle 100 to travel. Further, the brake 111 is controlled to generate a braking force, so that the vehicle 100 is decelerated. Here, the driving force generation mechanism 110 may be an engine, a hybrid mechanism of an engine and a motor, or a single motor.

The vehicle 100 is provided with a steering wheel 113. The steering wheel 113 is turned so that the direction of the wheels 114 is changed, and the vehicle 100 turns.

The driving force control device 120 controls the driving force generated by the driving force generation mechanism 110. A brake control device 121 controls the brake 111 to generate a predetermined braking force. In a case of automatic parking, the steering control device 122 controls the steering wheel 113 so that a predetermined wheel angle is obtained even if the driver does not operate the steering wheel 113. A transmission control device 123 performs control of switching the transmission 112 between forward movement and backward movement of a vehicle. Furthermore, the vehicle 100 is provided with a surrounding situation recognition sensor 125 for recognizing a surrounding situation of the vehicle and a vehicle speed sensor 126 for acquiring speed information of the vehicle. The surrounding situation recognition sensors 125 are installed on the front, rear, left and right sides of the vehicle 100, and include, for example, a camera and a sonar. Further, the vehicle speed sensor 126 that acquires speed information of the vehicle is not limited to wheel speed pulse information, and may perform calculation indirectly using a resolver rotation speed sensor of the motor, a rotation speed sensor of the transmission 112, or the like.

The vehicle control device 124 transmits a command value to the driving force control device 120, the brake control device 121, the steering control device 122, and the transmission control device 123 based on information from the surrounding situation recognition sensor 125 and the vehicle speed sensor 126. Furthermore, an input and output device 128 is provided for inputting and outputting input information from the driver and output information to the driver regarding information relating to automatic parking. Specifically, the input information includes determination of a parking position, start of automatic parking, and the like, and the output information includes a parking frame, route information, a position of turning back of a steering wheel, a bird's-eye view in which video around the own vehicle during automatic parking is synthesized, and the like.

Figure 2:
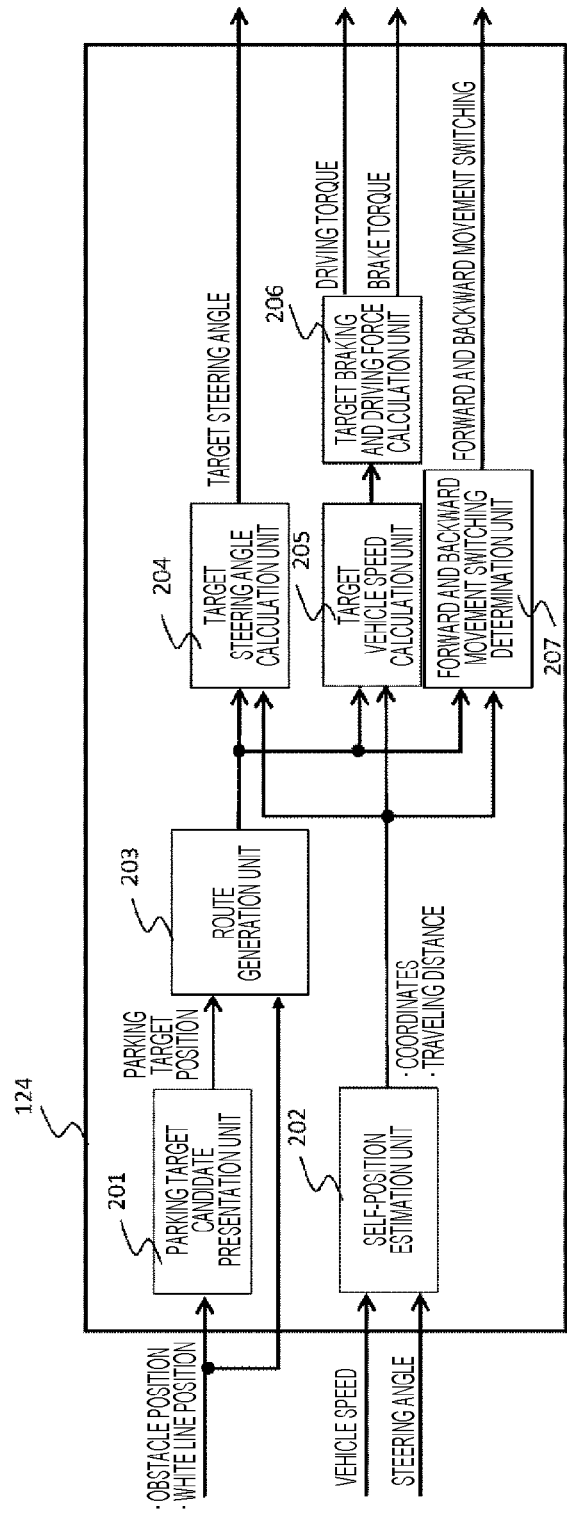
FIG. 2 is a block diagram of the vehicle control device equipped with the parking assistance device.

FIG. 2 is a block diagram of the vehicle control device 124.

The vehicle control device 124 includes a parking target candidate presentation unit 201, a self-position estimation unit 202, a route generation unit 203, a target steering angle calculation unit 204, a target vehicle speed calculation unit 205, a target braking and driving force calculation unit 206, and a forward and backward movement switching determination unit 207.

The parking target candidate presentation unit 201 calculates space in which the vehicle can be parked based on a position of the obstacle, a position of a white line, and the like obtained from the surrounding situation recognition sensor 125, and presents the space as a parking target candidate to the driver. Specifically, the parking target candidates are displayed on a screen of a navigation system or the like constituting the input and output device 128, and the driver selects a parking target position at which the driver wants to park from the parking target candidates.

When the automatic parking is started, the self-position estimation unit 202 calculates the own position of the vehicle, specifically, the coordinates and a traveling distance, based on the vehicle speed information obtained from the vehicle speed sensor 126 and the steering angle information obtained from the steering wheel 113.

The route generation unit 203 calculates a route in which the vehicle can move from a parking start position to the parking target position without hitting against an obstacle or the like based on the target parking position and a position of the obstacle. When the route can be generated, information on the curvature with respect to the traveling distance, a position of turning back of a steering wheel, and the like are output. Further, a detected step having a height that is determined as a height that the vehicle can climb over is not regarded as an obstacle, and a step that is determined as one that the vehicle cannot climb over is regarded as an obstacle.

The target steering angle calculation unit 204 calculates a target steering angle based on the curvature information with respect to the traveling distance, which is an output result of the route generation unit 203, and transmits the target steering angle to the steering control device 122. Here, the target steering angle is not limited to the output result of the route generation unit 203, and may be one obtained by adding a correction value of a steering amount when a relative relationship with the parking frame or the obstacle is shifted during the automatic parking.

The target vehicle speed calculation unit 205 determines a target vehicle speed in actual drive control based on the magnitude of the curvature, the position of an obstacle, and the like, which are output results of the route generation unit 203. At this time, when the target vehicle speed at the time of drive control changes, smooth acceleration and deceleration is realized by correcting the target vehicle speed in consideration of acceleration and further a jerk. Here, when the surrounding situation recognition sensor 125 detects a step, a wheel stop, or the like on a parking route after the automatic parking is started, the target vehicle speed is reduced. In this manner, at the time of collision with a step or a wheel stop, parking can be performed without an uncomfortable shock to the driver.

The target braking and driving force calculation unit 206 calculates required a braking or driving force based on a difference between the target vehicle speed and the vehicle speed information. At this time, in a case where a braking force is generated, brake torque is transmitted to the brake control device 121, and in a case where a driving force is generated, driving torque is transmitted to the driving force control device 120. Here, when a gradient, a step, or the like is detected by the surrounding situation recognition sensor 125, a driving force is corrected. Specifically, the correction is performed such that the driving force is increased when the vehicle travels on an upgrade, and is decreased when the vehicle travels on a downgrade. Further, when a step is detected, correction is performed so that the driving force is made larger as the step is higher. In this manner, the ability to follow the target vehicle speed can be improved.

The forward and backward movement switching determination unit 207 transmits switching of forward and backward movements to the transmission control device 123 based on forward and backward movement switching information that is an output result of the route generation unit 203.

Figures 3, 4:
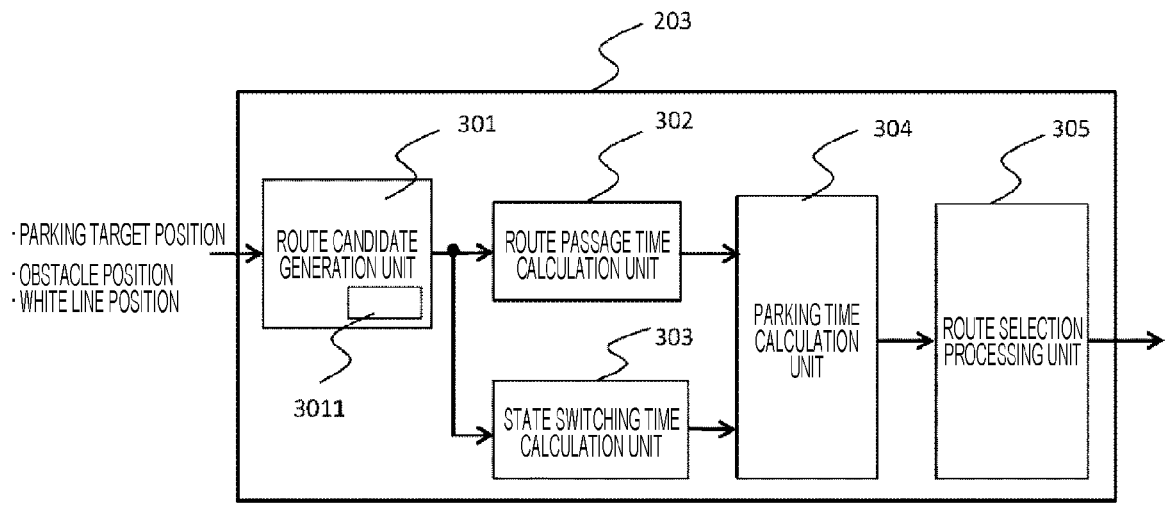
FIG. 3 is a detailed block diagram of a route generation unit.
FIG. 4 is a diagram showing an output example of a parking time calculation unit.

FIG. 3 is a detailed block diagram of the route generation unit 203.

The route generation unit 203 includes a route candidate generation unit 301, a route passage time calculation unit 302, a state switching time calculation unit 303, a parking time calculation unit 304, and a route selection processing unit 305.

The route candidate generation unit 301 searches for a route from the parking start position to the parking target position by changing a reference vehicle speed and a route shape based on the parking target position selected on the parking target candidate presentation unit 201 and the position of an obstacle and the position of a white line obtained from the surrounding situation recognition sensor 125. In a case where a route to the parking target position is found, the route is registered as a route candidate. Here, the reference vehicle speed and the route shape are changed so that at least one or more route candidate is obtained. In a case where no route is found, the driver is notified of the fact. The reference vehicle speed and the route shape will be described later.

The route passage time calculation unit 302 calculates, for each route candidate, the time required to pass through the route based on the reference vehicle speed and the length of the route. Here, route passage time may be calculated by using a vehicle speed profile in which a speed at the time of passing the position is sequentially calculated in consideration of, without limitation to the reference vehicle speed, the limitation of acceleration and a jerk with respect to the reference vehicle speed. In this manner, the route passage time can be calculated more accurately.

Specifically, a target acceleration at of the vehicle 100 is calculated by Equation (1) below using an upper jerk Jmax. Next, a target speed Vt is calculated by Equation (2) below using the target acceleration at. Here, the configuration may be such that only the upper limit of the acceleration is set. However, by setting the upper jerk, it is possible to further suppress the vehicle longitudinal vibration and the like.

[Equation 1]

$$\alpha_t(t) = \alpha_t(t-1) + J_{max} \quad (1)$$

[Equation 2]

$$V_t(t) = V_t(t-1) + \alpha_t(t-1) \quad (2)$$

The state switching time calculation unit 303 calculates, for each of the route candidates, the time required for switching between forward and backward movements of the vehicle, and the time (state switching time) required to change steering to a predetermined steering angle in a state where the vehicle is stopped (hereinafter, referred to as steering without driving). The time required for switching between forward and backward movements of the vehicle is time for changing a gear of the transmission when the vehicle is moving forward and backward. Here, since forward and backward movements are switched by the driver in some automatic parking systems, the time required for switching between forward and backward movements of the vehicle is not considered in such systems. Further, the steering control device 122 suppresses an amount of change in steering so as not to apply an abrupt electric load. In particular, since the load becomes larger at the time of the steering without driving, time is required to change the steering amount to a predetermined amount at the time of the steering without driving. These are combined and output as state switching time.

The parking time calculation unit 304 outputs parking time Tp obtained by adding route passage time Td and state switching time Ts for each route candidate. Specifically, as shown in FIG. 4, in a manner corresponding to route candidates 1, 2, N, route switching time Td(1), Td(2), . . . , Td(N), state switching time Ts(1), Ts(2), . . . , Ts(N), and parking time Tp(1), Tp(2), . . . , Tp(N) are output. Here, Td(1)+Ts(1)=Tp(1), Td(2)+Ts(2)=Tp(2), . . . , Td(N)+Ts(N) =Tp(N). Note that the parking time calculation unit 304 is not limited to outputting only parking time, and may output the route passage time Td and the state switching time Ts.

The route selection processing unit 305 selects, from among the parking time Tp(1), Tp(2), . . . , Tp(N) of the route candidates 1, 2, . . . , N output by the parking time calculation unit 304, a route in which parking time is minimized. This makes it possible to select a route with short parking time.

Note that the route selection processing unit 305 is not limited to selecting a route with minimum parking time, and selects a route candidate in which parking time is short, for example, a route in which the route passage time Td is larger than the state switching time Ts when a difference between Tp(1) and Tp(N) is less than a predetermined value. In this manner, it is possible to select a route that requires less time for the steering without driving and forward and backward movements, and parking in which the movement load of the driver's gazing point generated at the time of switching between forward and backward movements is suppressed.

Furthermore, a route having a shorter route length may be selected, for example, when a difference between Tp(1) and Tp(N) is less than a predetermined value. In this manner, parking can be performed in a compact parking route, and the driver's discomfort can be reduced.

Figure 5:
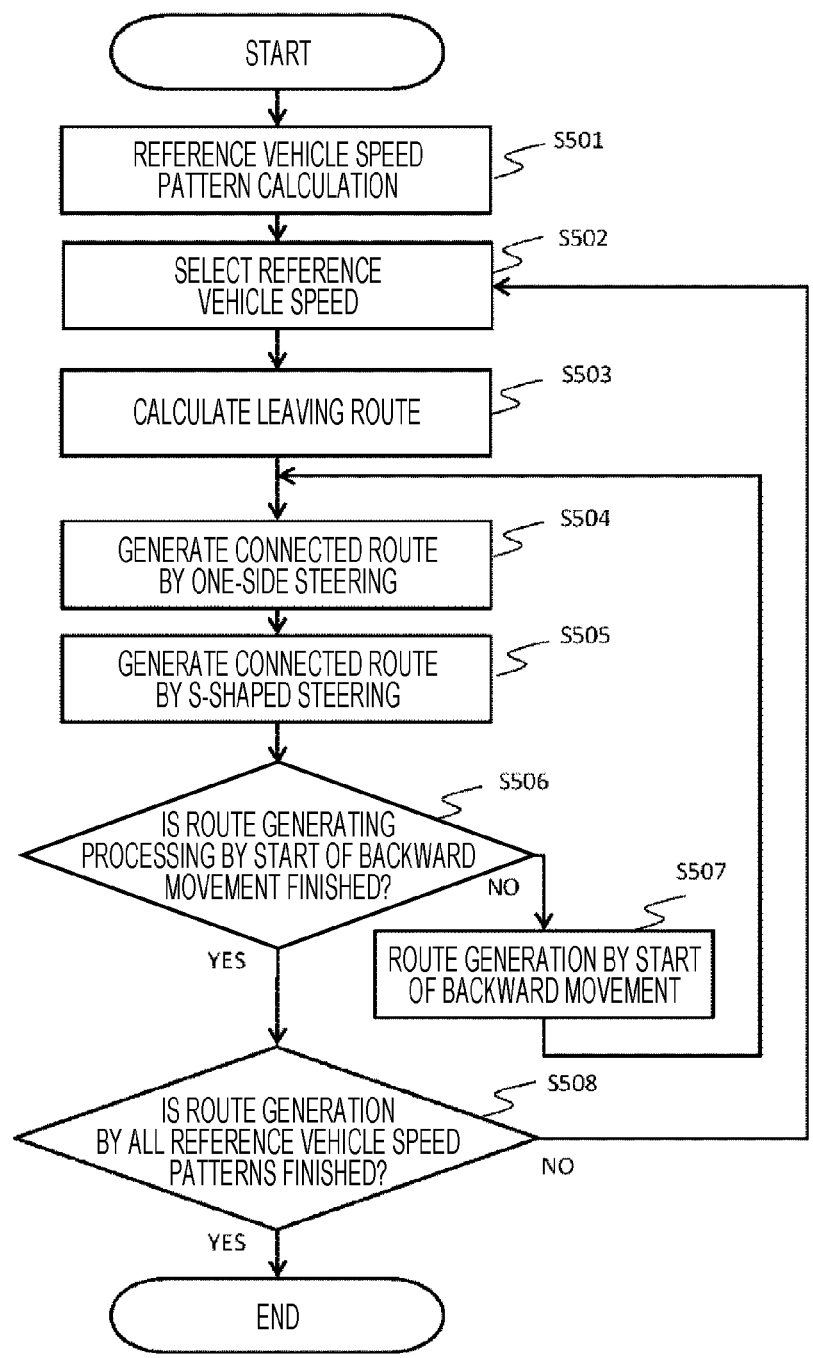
FIG. 5 is a flowchart of a route candidate generation unit.

FIG. 5 is a flowchart of the route candidate generation unit 301. Note that a program shown in this flowchart can be executed by a computer including a CPU, a memory, and the like. All or part of the processing may be realized by a hard logic circuit. Furthermore, this program can be provided by being stored in a storage medium of the vehicle control device 124 in advance. Alternatively, the program may be stored and provided on an independent recording medium, or the program may be recorded and stored on a storage medium of the vehicle control device 124 via a network line. The program may also be supplied as a computer-readable computer program product in various forms, such as a data signal (carrier wave).

The processing procedure of the route candidate generation unit 301 will be described with reference to FIG. 5.

In Step S501, reference vehicle speed pattern calculation is performed. First, a reference vehicle speed pattern Vbase for traveling on a route is calculated. Specifically, based on an upper limit vehicle speed Vmax with respect to the parking space, a vehicle speed is divided at predetermined intervals Vd so as to generate the reference vehicle speed pattern Vbase as shown in Equation (3) described below.

[Equation 3]

$$V_{base} = [V_{max}, V_{max} - V_d, V_{max} - 2V_d, \ldots] \quad (3)$$

In the present embodiment, the upper limit value of the speed set for the parking space is as described below. The upper limit vehicle speed Vmax is set to be smaller as a road width becomes narrower. Further, as a distance from an obstacle becomes shorter, the upper limit vehicle speed Vmax is set to be smaller. Specifically, the route candidate generation unit 301 includes a switching unit 3011. The switching unit 3011 sets the reference vehicle speed to be smaller as a road width becomes smaller or as a distance from an obstacle becomes shorter. For example, if the road width is 10 m, the upper limit vehicle speed Vmax is set, and if the road width is 6 m, Vmax−2Vd is set. Alternatively, if the distance to an obstacle is 3 m, the upper limit vehicle speed Vmax is set, and if the distance is 0.5 m, Vmax−3Vd is set. In this manner, in a situation where the road is narrow or when the distance to an obstacle is short, the speed can be reduced, and the driver's fear can be alleviated.

Further, by setting the upper limit of the vehicle speed Vmax to be smaller in the backward movement than in the forward movement, the speed at the time of backward movement in which checking the situation is difficult for the driver can be reduced, and the driver's fear can be alleviated.

Furthermore, even at the same curvature, the higher the vehicle speed, the greater the lateral acceleration. Therefore, the larger the curvature, the smaller the reference vehicle speed is set. In this manner, drivability is improved without causing an excessive lateral acceleration on the driver.

Furthermore, the speed is reduced under an environment where it is difficult for the driver to visually recognize the situation around the vehicle. Specifically, based on information from the illuminance sensor and the surrounding situation recognition sensor 125, the speed is set to be low when a situation where a surrounding environment is dark is detected, and when a raindrop is detected by a wiper signal or the surrounding situation recognition sensor 125. The driver's fear can be suppressed by reducing the speed in a situation where it is difficult for the driver to recognize the surrounding situation.

In Step S502, a reference vehicle speed used in the automatic parking control calculation is selected. Specifically, one reference vehicle speed for which the route generating processing has not been performed is selected from the reference vehicle speed pattern, and, based on the reference vehicle speed, route candidate generating processing shown from Step S503 is executed. For example, in a case where a first upper limit vehicle speed set based on a road width, a second upper limit vehicle speed set based on a distance to an obstacle, a third upper limit vehicle speed set based on the curvature of a route, and a fourth upper limit vehicle speed set based on the brightness of a surrounding environment are set, route generating processing is performed using the first to fourth upper limit speeds. Therefore, Vmax of the reference vehicle speed pattern is the upper limit vehicle speed determined based on the surrounding environment. Then, based on the upper limit vehicle speed Vmax, the reference vehicle speed at the time of the parking route calculation is changed as Vmax−Vd, Vmax−2×Vd, . . . .

For example, the route generating processing can be performed with two reference vehicle speeds, Vmax−Vd and Vmax−2×Vd, or three reference vehicle speeds, Vmax, Vmax−Vd, and Vmax−2×Vd.

By performing the parking route calculation as described above, even in a case where there is only one route shape, it is possible to calculate a plurality of parking patterns based on a plurality of vehicle speeds, that is, automatic parking systems in which the route shapes are the same and parking time is different. Alternatively, even if the number of the reference vehicle speeds is one, a plurality of parking patterns based on a plurality of route shapes, that is, automatic parking systems in which the reference vehicle speeds are the same and the route shapes are different, can be calculated by performing the parking route calculation using a parking preparation route by one-side steering and a parking preparation route by S-shaped steering.

Figure 6:
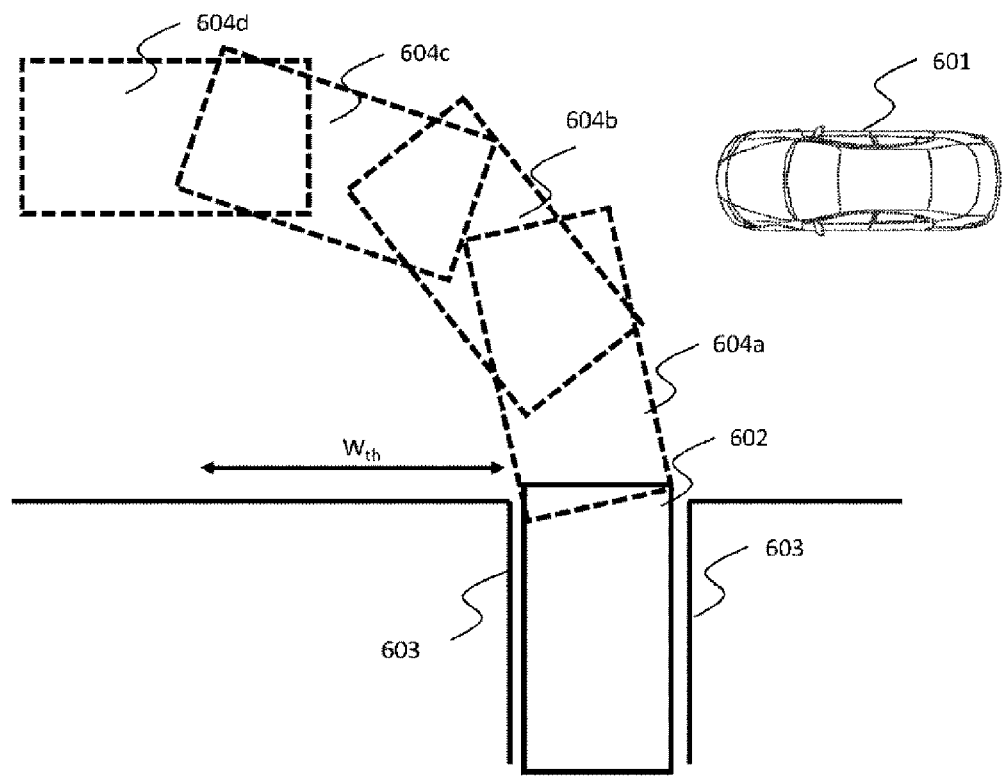
FIG. 6 is a diagram explaining a leaving route.

In Step S503, a leaving route is calculated. FIG. 6 is a diagram for explaining a leaving route. FIG. 6 shows a leaving route, which is a route in which the vehicle can leave without contacting left and right obstacles 603 (such as a parked vehicle) from a state where the vehicle is accurately placed in a parking frame 602, by vehicle positions 604a to 604d.

Here, in order to shorten a route length, it is desirable to sequentially calculate the leaving route based on a minimum turning radius at the time of turning. However, the leaving route may be calculated by increasing the radius at the time of turning.

Furthermore, the configuration may be such that the radius at the time of turning is increased as a road width in front of the parking frame 602 is wider. In this manner, when the parking space is large, the drivability is improved with gentle turning.

In Step S503, a leaving route is calculated until a predetermined end condition is satisfied. Here, the calculation of a leaving route is performed until at least one condition, such as a condition that the direction of the vehicle after leaving is perpendicular to the parking direction of the parking frame 602, parallel to a path direction, and the same direction as the direction of the vehicle at the parking start position 601, a condition that the leaving vehicle reaches a point away from the parking frame by a predetermined distance Wth, or the like, is satisfied as the end condition.

Next, the processing proceeds to Step S504, where a connected route is generated by one-side steering. Specifically, whether the vehicle can be connected by one-side steering to any of the vehicle positions 604a to 604d when the vehicle moves along the leaving route shown in FIG. 6 from the parking start position 601 shown in FIG. 6 is determined. If the vehicle can be connected, the route information is stored with the vehicle position at the time of connection as a reaching target position of the vehicle. Here, the one-side steering refers to operation of turning the steering wheel 113 of the own vehicle to only one of the left and right sides (one-side steering). The connectable route information means a route in which the vehicle can be moved from the parking start position 601 to the reaching target position without interfering with an obstacle by one-side steering.

Figure 7:
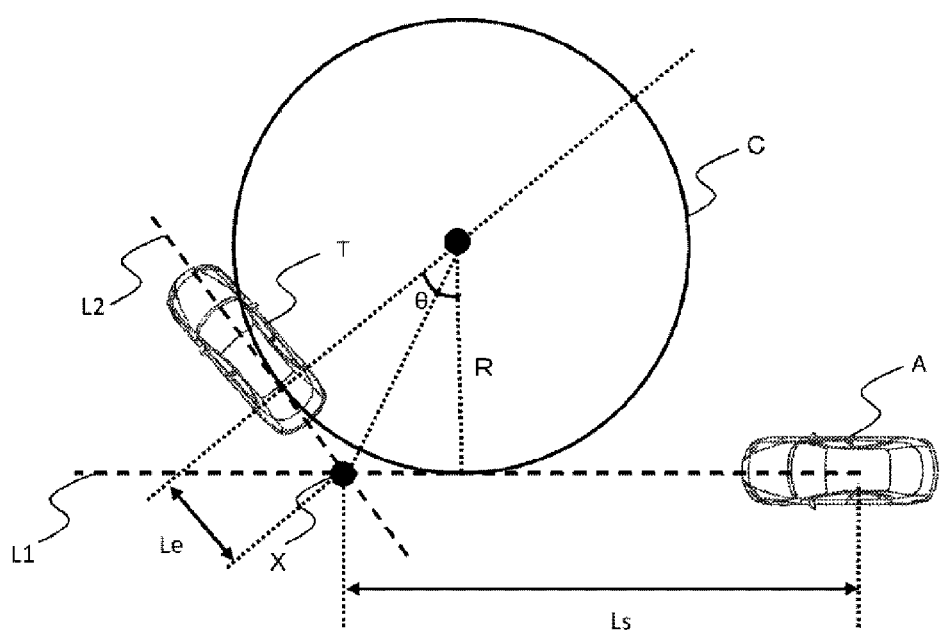
FIG. 7 is a diagram showing one-side steering connection.

FIG. 7 is a diagram showing one-side steering connection. As shown in FIG. 7, in order to generate a route (parking preparation route) by one-side steering from a parking start position A to a reaching target position T, calculation processes (1) to (3) below are executed.

(1) An intersection X between an axis L1 of the vehicle at the parking start position A and an axis L2 of the vehicle at the reaching target position T is obtained.

(2) Then, a distance Ls between the intersection X and the parking start position A and a distance Le between the intersection X and the target position T are calculated, and the shorter distance is selected.

(3) In the example shown in FIG. 7, the distance Le is selected. Then, a circle C having two of the axes L1 and L2 as a common tangent is drawn. The radius R of the circle C at that time is calculated by Equation (4) below.

[Equation 4]

$$R = \frac{L_e}{\tan\frac{\theta}{2}} \qquad (4)$$

In this way, a route from the parking start position A to the reaching target position T is generated by combining a straight line and an arc. Here, the connection by one-side steering is not limited to a straight line and an arc, and a route may be generated using a relaxation curve such as clothoid.

The leaving route obtained by the calculation of a leaving route in Step S503 and the parking preparation route obtained by generation of the connected route by one-side steering in Step S504 are combined and stored in a memory as a first parking route.

In Step S505, processing of generating a connected route by S-shaped steering is executed. In Step S505, whether the vehicle can be connected by S-shaped steering to any of the vehicle positions 604a to 604d when the vehicle moves along the leaving route shown in FIG. 6 from the parking start position 601 shown in FIG. 6 is determined. If the vehicle can be connected, the route information is stored with the vehicle position at the time of connection as a reaching target position of the vehicle.

Figure 8:
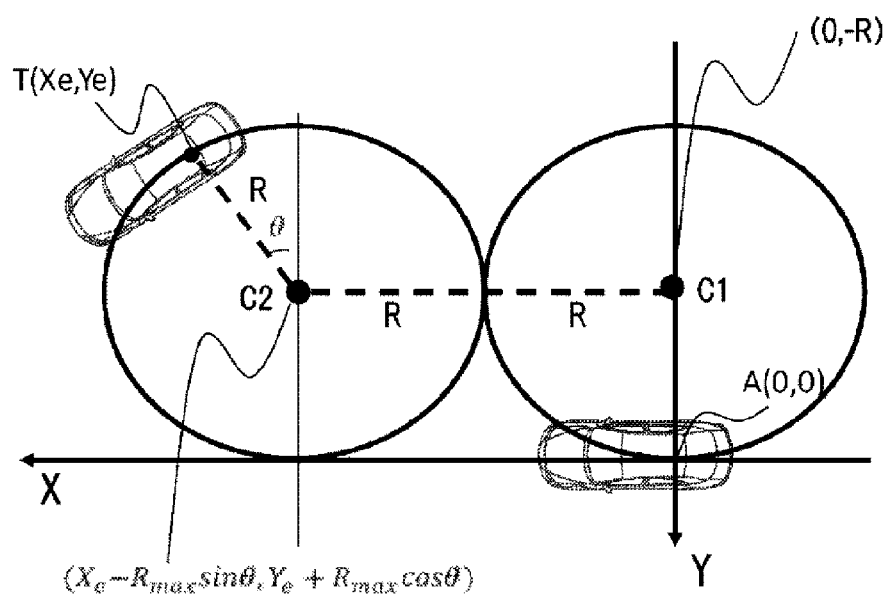
FIG. 8 is a diagram showing S-shaped steering connection.

FIG. 8 is a diagram showing S-shaped steering connection. As shown in FIG. 8, in order to generate a route by S-shaped steering from the parking start position A to the reaching target position T, a radius for drawing an S-shape is calculated. Here, the calculation can be facilitated by setting a turning radius of S-shaped steering to the same radius R. However, a connected route by S-shaped steering may be generated using a different radius. By using a different radius, the degree of freedom of a route by S-shaped steering is increased, and reaching is facilitated. Here, a case of the same radius R will be described. When the coordinates of the parking start position A are A(0, 0), the coordinates of the reaching target position T are T(Xe, Ye), an angle with respect to the target position T, that is, the direction of the vehicle at the target position T when the direction of the vehicle at the parking start position A is 0 degree is an angle θ, Equation (5) below is established for the radius R of the common circles from a distance between center coordinates since the center coordinates C1 and C2 of the circles are obtained, and R is obtained by Equation (6) below.

[Equation 5]

$$2R = \sqrt{(X_e - R\sin\theta)^2 + (Y_e + R\cos\theta + R)^2} \quad (5)$$

[Equation 6]

$$R = \frac{X_e\sin\theta - Y_e(1+\cos\theta) - \sqrt{\{X_e\sin\theta - Y_e(1+\cos\theta)\}^2 - 2(\cos\theta - 1)(X_e^2 + Y_e^2)}}{2(\cos\theta - 1)} \quad (6)$$

Using the calculated turning radius R, a connected route by S-shaped steering is generated. Here, the connection by an S-shape is not limited to an arc, and a route may be generated using a relaxation curve such as clothoid. As described above, by generating a connected route using not only one-side steering but also S-shaped steering, the degree of freedom is increased and a connected route is easily generated.

The leaving route obtained by the calculation of a leaving route in Step S503 and the parking preparation route obtained by generation of the connected route by S-shaped steering in Step S505 are combined and stored in a memory as a second parking route.

Next, the processing proceeds to end determination of the route generating processing by start of backward movement in Step S506. In this Step S506, if the route generating processing by start of backward movement is not performed, the processing proceeds to route generation by start of backward movement in Step S507, and if the route generating processing by start of backward movement is already performed, the processing proceeds to end determination of the route generation by all reference vehicle speed patters in Step S508.

Figure 9:
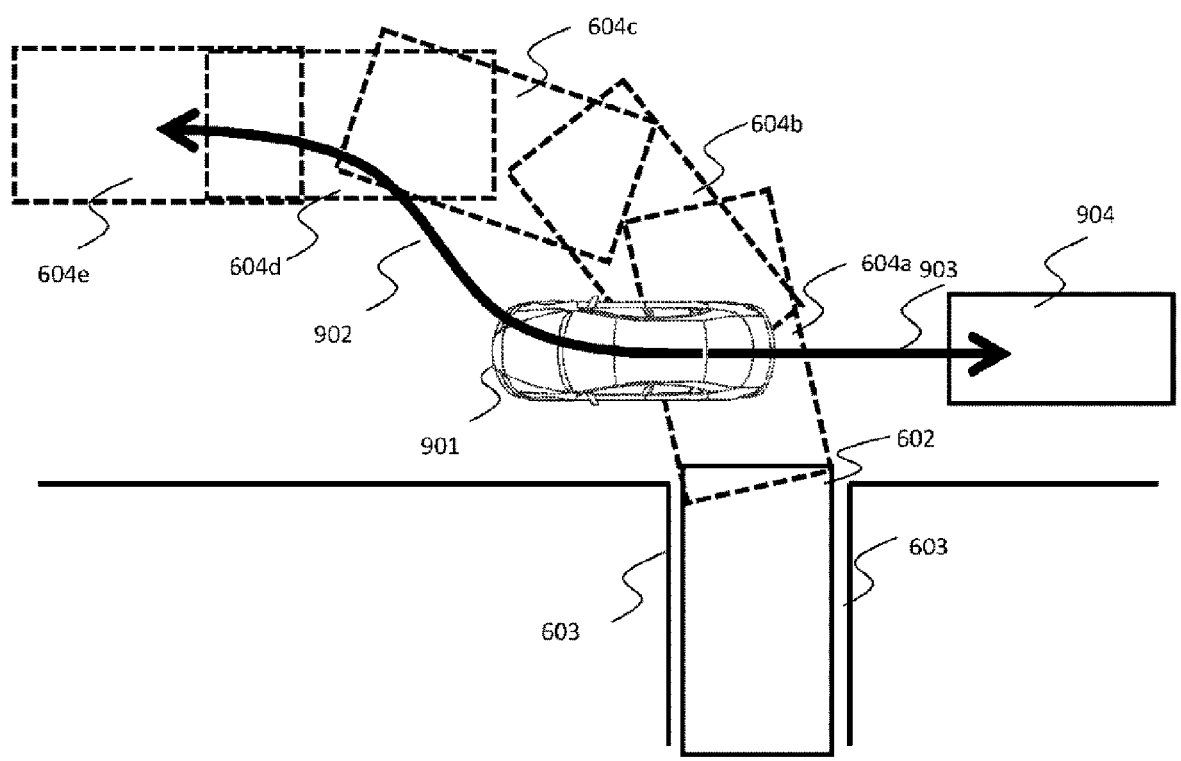
FIG. 9 is a diagram showing route generation by start of backward movement.

In Step S507, route generation by start of backward movement is performed. FIG. 9 is a diagram showing the route generation by start of backward movement. As shown in FIG. 9, when an own vehicle position 901 at start of parking has passed the parking frame, it is difficult to connect the position to any of the vehicle positions 604a to 604d included in a route in which the vehicle can leave by one-side steering and S-shaped steering, and the position can be connected only to a vehicle position 604e which is in a location farther from the parking frame 602 than the vehicle positions 604a to 604d along a route in which the vehicle can leave as shown by a connected route 902, which causes the driver's discomfort. Therefore, as shown in a backward movement route 903, an own vehicle position 904 that is moved back by a predetermined amount from the own vehicle position 901 at start of parking is set, and a connected route from the own vehicle position 904 to any of the vehicle positions 604a to 604d is searched for. In this manner, the parking route becomes compact, and the driver's discomfort can be reduced.

Here, the own vehicle position 904 after backward movement is within a predetermined value from the obstacle 603 on the side, or a vehicle front position of the own vehicle is on the right side of the obstacle 603 on the side. This reduces the driver's discomfort due to the backward movement.

Furthermore, in a case where the own vehicle position 901 at the time of start of parking is not parallel to a road, a vehicle angle is adjusted at the time of backward movement, so that the own vehicle position 901 becomes parallel to the road. This makes it easier to successfully search for a connected route to the vehicle positions 604a to 604d at the time of the next forward movement.

In Step S507, after generation of a backward movement route for backward movement of the vehicle from the own vehicle position 901 at the time of start of parking to the own vehicle position 904, the generation of a connected route by one-side steering in Step S504 and the generation of a connected route by S-shaped steering in Step S505 are executed. In a case where both of the route generations are successful, a route obtained by combining the first parking route including the parking preparation route by one-side steering and the backward movement route is stored in a memory as a first route candidate and a route obtained by combing the second parking route including the parking preparation route by S-shaped steering and the backward route is stored as a second route candidate in the memory.

In Step S508, end determination of the route generation by all reference vehicle speed patterns is performed. In Step S508, if the route generation for all reference vehicle speeds is finished, the generation of a route candidates ends, and if not, the processing returns to the processing of Step S502.

The route candidate generation unit 301 executes the processing of the flowchart shown in FIG. 5 as described above, and generates a plurality of route candidates. Then, the parking time calculation unit 304 calculates parking time for each route candidate, and the route selection processing unit 305 selects a route with shortest parking time, so that automatic parking with short parking time is made possible.

Figure 10:
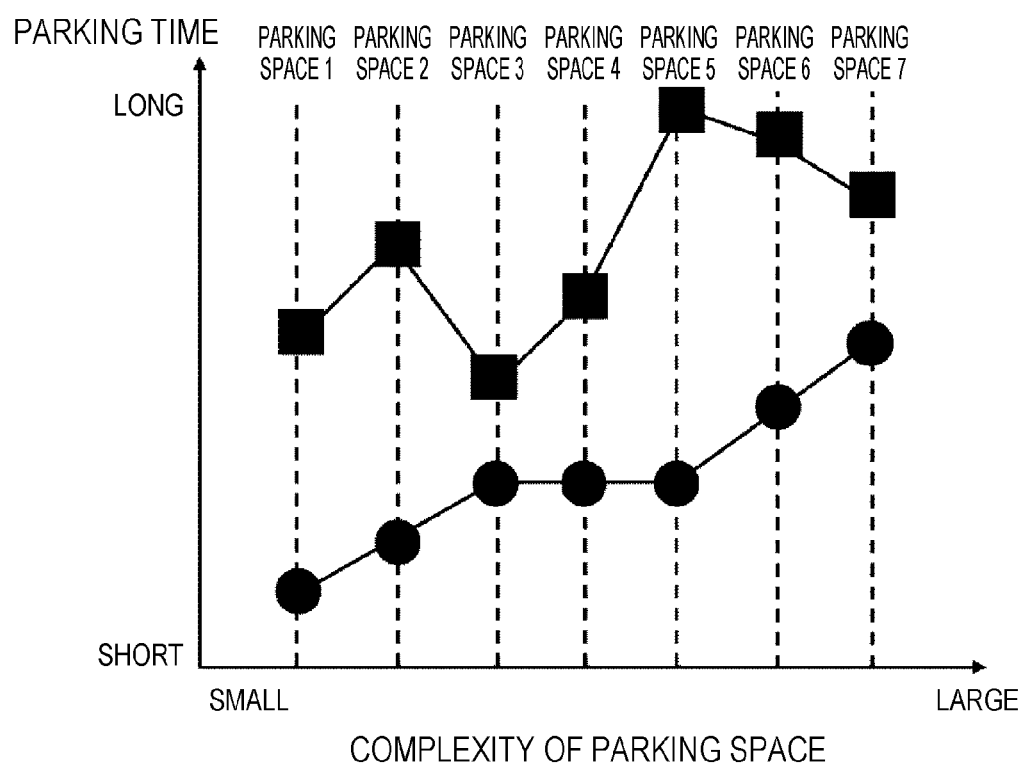
FIG. 10 is a diagram showing a relationship between complexity of parking space and parking time.

FIG. 10 is a diagram showing a relationship between complexity of parking space and parking time. In FIG. 10, the horizontal axis shows complexity of parking space, and the vertical axis shows parking time. The complexity of parking space is a road width and the number of obstacles. For example, the complexity of parking space is larger as parking space such as a road width is narrower, and is larger as the number of obstacles increases. A black circle mark in the diagram shows a case where the present embodiment is applied, and a black square mark shows a case where the present embodiment is not applied. In a case of automatic parking to which the present embodiment is not applied, the route generation that minimizes parking time is not performed. Accordingly, parking time varies regardless of the complexity of parking space. However, in a case where the present embodiment is applied, a route in which parking time is shortest is selected. Accordingly, since parking time becomes equal or monotonically increases as the complexity of parking space becomes larger, the driver's discomfort caused by the variation in parking time can be reduced.

Second Embodiment

In a second embodiment, a configuration diagram of the vehicle 100 including the vehicle control device 124 equipped with the parking assistance device is similar to FIG. 1 described in the first embodiment, and illustration of the diagram is omitted. Furthermore, in the second embodiment, the block diagram of the vehicle control device 124 is similar to FIG. 2 described in the first embodiment, and illustration of the diagram is omitted.

Figure 11:
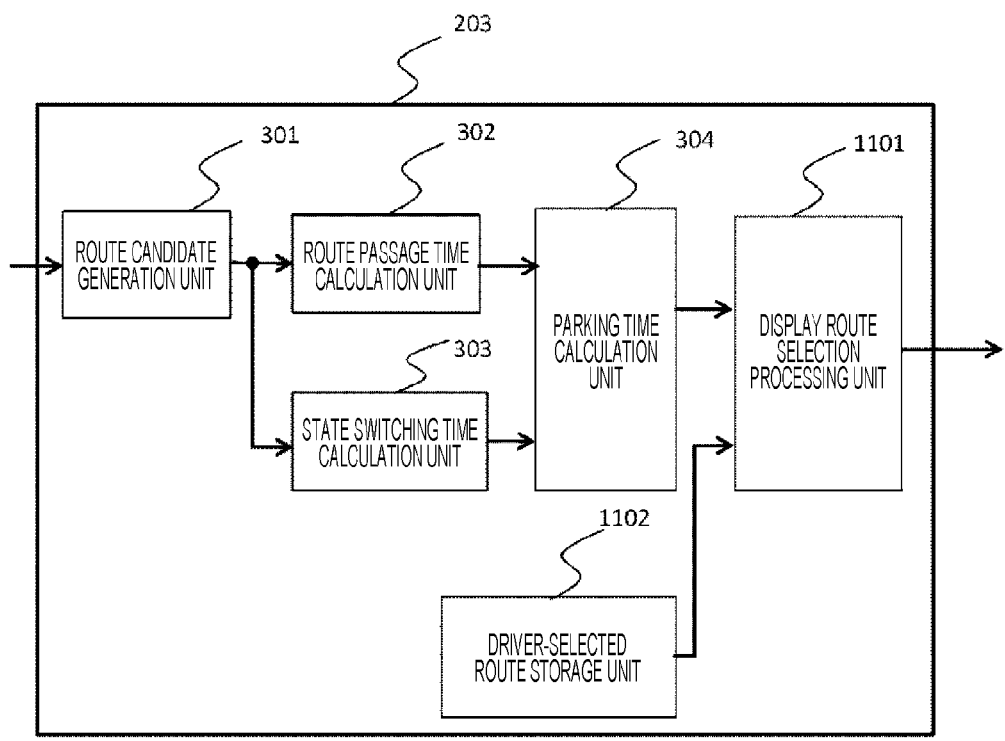
FIG. 11 is a detailed block diagram of the route generation unit according to a second embodiment.

FIG. 11 is a detailed block diagram of the route generation unit 203 in the second embodiment. In FIG. 11, the same portion as that of the route generation unit 203 shown in FIG. 3 described in the first embodiment is denoted by the same reference numeral, and description of the portion will be omitted. As shown in FIG. 11, the second embodiment has a configuration in which a display route selection processing unit 1101 and a driver-selected route storage unit 1102 are newly provided. In the second embodiment, a route selected by the driver is stored, and the preference of the driver for route selection is learned.

The route generation unit 203 will be described with reference to FIG. 11. Processing by the route passage time calculation unit 302 and the state switching time calculation unit 303 is performed for each route candidates output by the route candidate generation unit 301, and the parking time calculation unit 304 calculates parking time. The display route selection processing unit 1101 selects a route with short parking time or the like and displays the selected route or the like on the input and output device 128 (FIG. 1).

Figure 12:
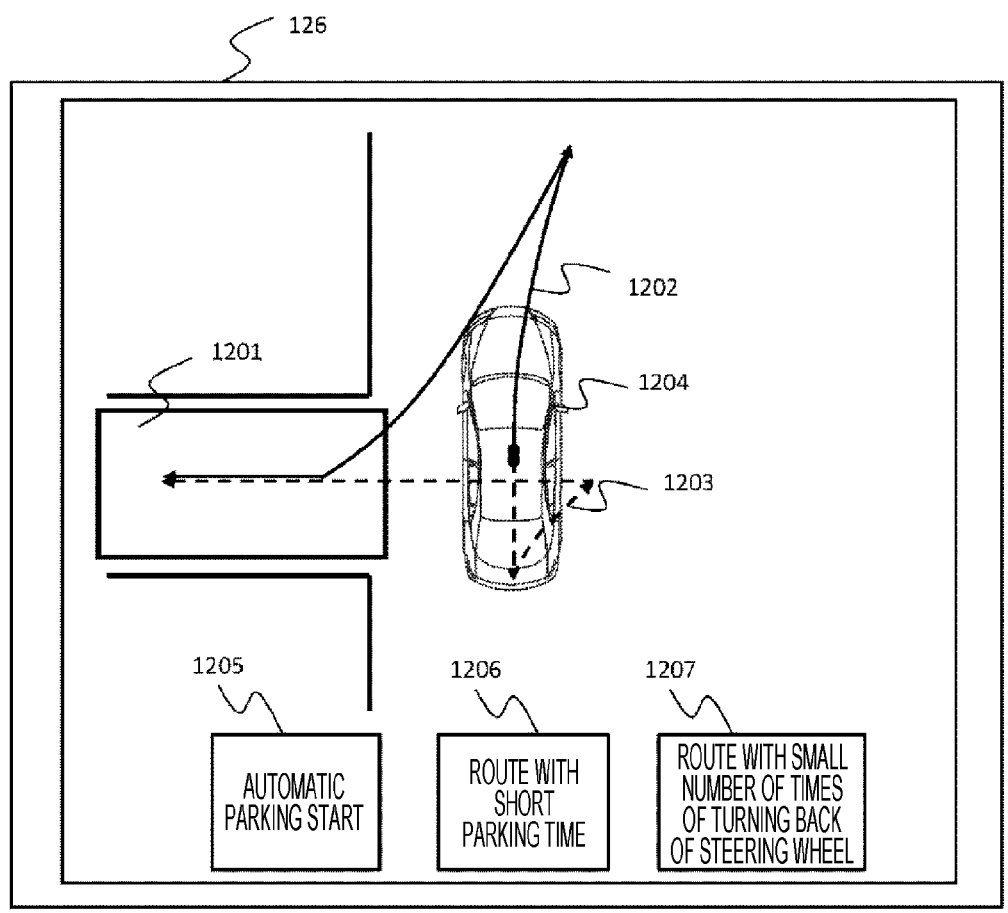
FIG. 12 is a diagram showing a display example of an input and output device according to the second embodiment.
Figure 13:
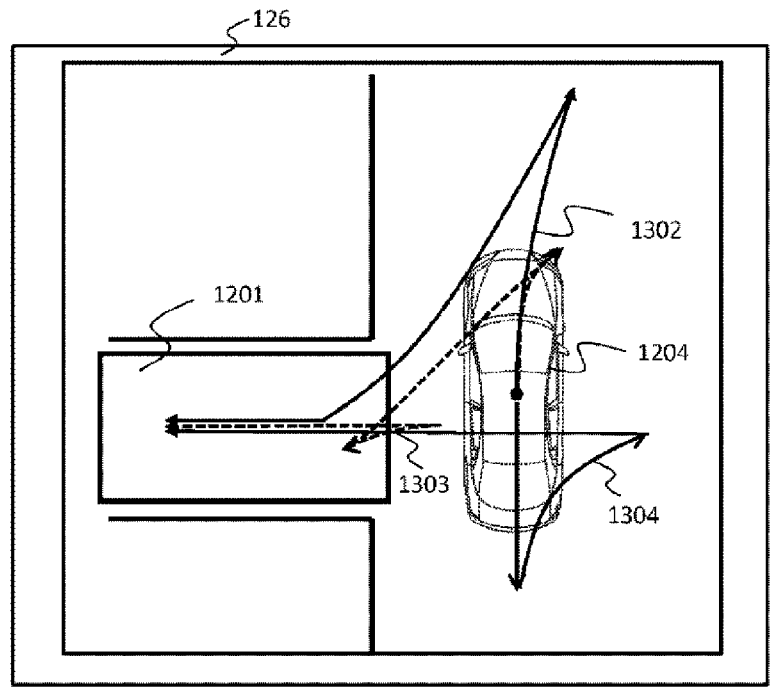
FIG. 13 is a diagram showing a display example of the input and output device according to the second embodiment.
Figure 14:
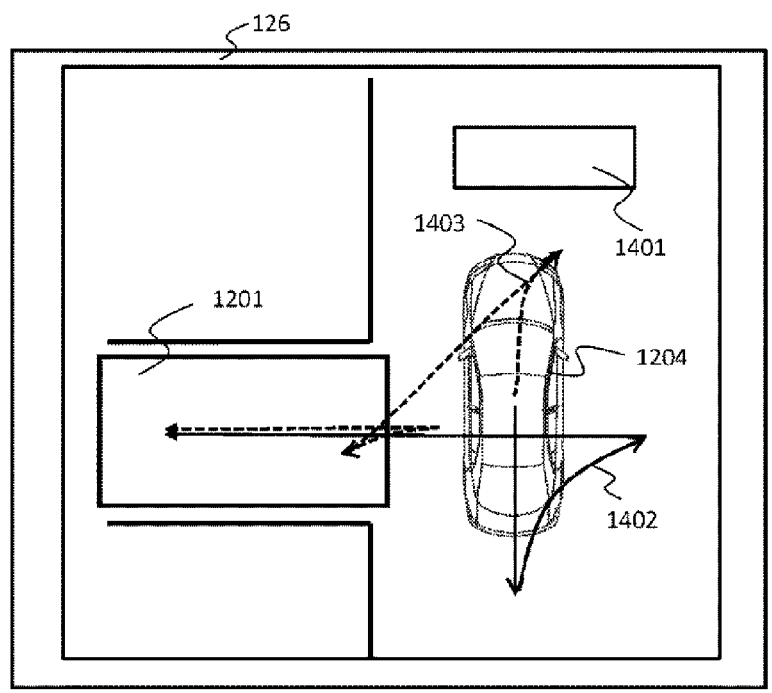
FIG. 14 is a diagram showing a display example of the input and output device according to the second embodiment.

FIGS. 12 to 14 are display examples of a route of parking displayed on the input and output device 128. As shown in FIG. 12, the display route selection processing unit 1101 selects a route 1202 indicated by a solid line with a smallest number of times of turning back of a steering wheel and a route 1203 indicated by a dotted line with shortest parking time with respect to a parking target position 1201, and displays the selected routes on the input and output device 128. Note that parking time, the number of times of turning back of a steering wheel, and the like may be displayed on the input and output device 128 in association with a track of a planned traveling route.

Further, the input and output device 128 displays a first route with a smallest number of times of turning back of a steering wheel of the vehicle or a second route with shortest parking time. Furthermore, in a case where only one of start of forward movement and start of backward movement of the vehicle is displayed for the first route or the second route, a third route with shortest parking time in the other one that is not displayed.

The driver selects a route by looking at the route information and operating a button 1206 for designating a route with short parking time or a button 1207 for designating a route with a small number of times of turning back of a steering wheel. As the driver selects a route, automatic parking suited to the driver's sensitivity can be realized. However, in a case where the number of times of turning back of a steering wheel are the same and only the parking time is different in at least two or more route candidates, only a route with shortest parking time is displayed.

In addition, as shown in FIG. 13, in a case where a route 1302 with a smallest number of times of turning back of a steering wheel and a route 1303 with shortest parking time both start by forward movement, a route 1304 that starts by backward movement with shortest parking time is additionally displayed.

Further, as shown in FIG. 14, in a case where an obstacle 1401 is ahead of an own vehicle 1204, and a route 1402 with the same number of times of turning back of a steering wheel and shortest parking time starts by backward movement, a route 1403 that starts by forward movement with shortest parking time may be additionally displayed. This is because when there is an obstacle such as a stopped vehicle in front of or behind the own vehicle 1204, and the driver desires to avoid approaching the obstacle, automatic parking can be started from a desired direction. This can reduce the driver's discomfort.

The route of each of the conditions described above can be calculated by similar calculation as the calculation described with reference to FIGS. 6 to 9.

The driver-selected route storage unit 1102 records the number of times that the first route with a smallest number of times of turning back of a steering wheel is selected and the number of times that the second route with shortest parking time is selected. Then, a route that is selected a large number of times is displayed as an initial setting route on the input and output device 128 and presented to the driver. Which of the route with a smallest number of times of turning back of a steering wheel and the route with shortest parking time is selected by the driver is stored, so that the preference for the route selection of the driver is learned. As a result of learning, a route that is selected by the driver a large number of times is displayed as an initial value of route selection. As a specific method of displaying, there is a method of changing the color, thickness, and the like of a track of a planned traveling route for a route corresponding to the initial value of route selection. Furthermore, the initial value of route selection is set for each driver, and when an automatic parking start button 1205 is pressed without a route being selected, automatic parking is started with the initial value of route selection. This eliminates the need for the driver to select a route each time automatic parking is performed, and can save time and effort for operation.

Figure 15:
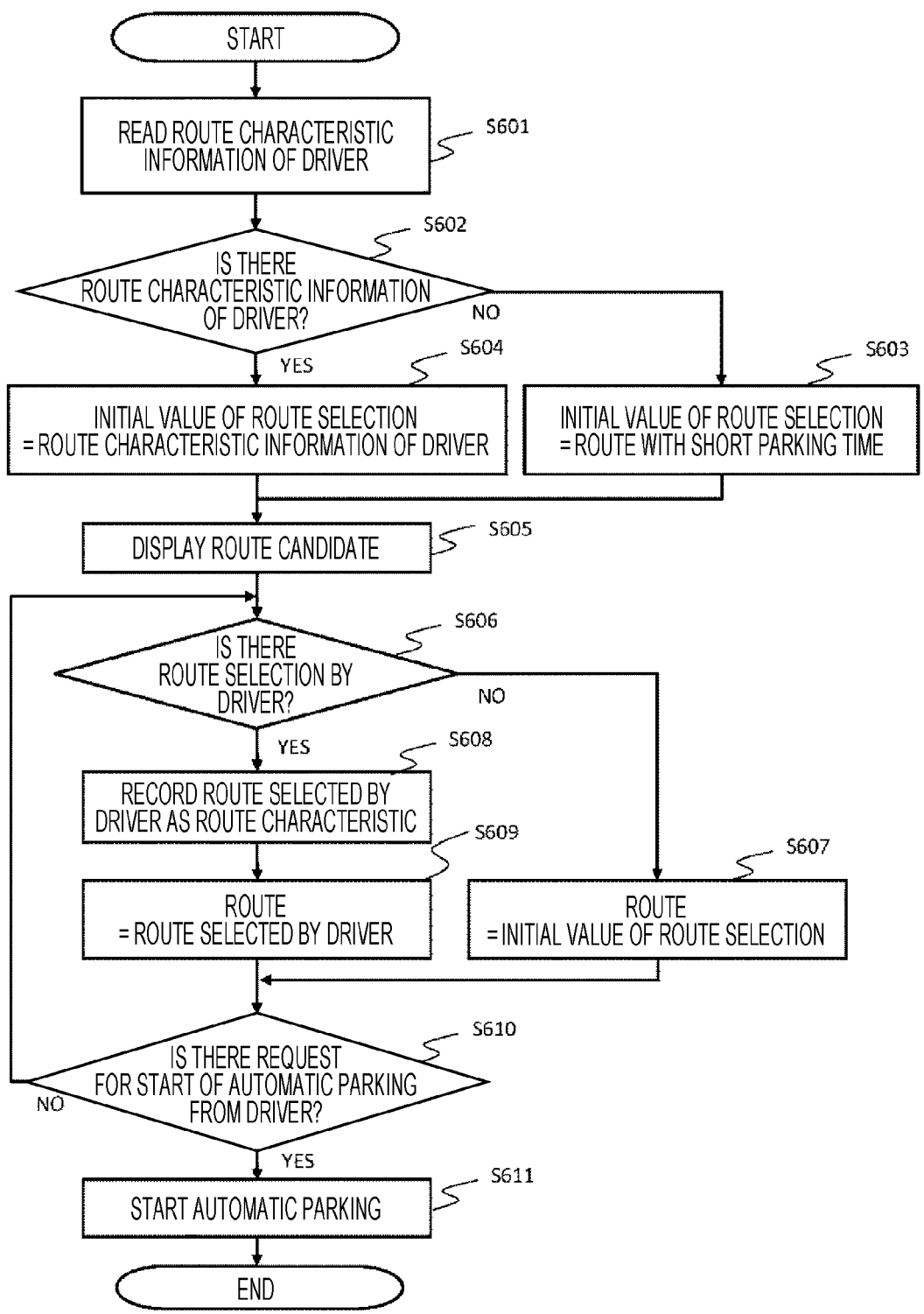
FIG. 15 is a flowchart showing processing operation of a driver-selected route storage unit according to the second embodiment.

FIG. 15 is a flowchart showing processing operation of the driver-selected route storage unit 1102. Note that a program shown in this flowchart can be executed by a computer including a CPU, a memory, and the like. All or part of the processing may be realized by a hard logic circuit. Furthermore, this program can be provided by being stored in a storage medium of the vehicle control device 124 (the driver-selected route storage unit 1102) in advance. Alternatively, the program may be stored and provided on an independent recording medium, or the program may be recorded and stored on a storage medium of the vehicle control device 124 (the driver-selected route storage unit 1102) via a network line. The program may also be supplied as a computer-readable computer program product in various forms, such as a data signal (carrier wave).

In Step S601 in FIG. 15, route characteristic information of the driver is read. The route characteristic information of the driver is information that relates to the tendency of the driver to select a route, such as whether the driver tends to select a route with short parking time, whether the driver tends to select a route with a small number of times of turning back of a steering wheel, or the like. Specifically, for example, the number of times a route with a smallest number of times of turning back of a steering wheel is selected or the number of times a route with shortest parking time is selected. Each time the driver selects a route, the route characteristic information of the driver is recorded in a memory in Step S608 described later for each driver, and the information is read in Step S601. Note that the driver is identified by fingerprint authentication, input of an ID number, or the like.

In next Step S602, whether there is read route characteristic information of the driver is determined. In a case where there is determined to be no such information, route characteristic information of the driver is yet to be recorded, and the processing proceeds to Step S603.

In Step S603, a route with short parking time is set as route characteristic information as an initial value for route selection. In a case where there is determined to be read route characteristic information of the driver in Step S602, the processing proceeds to Step S604.

In Step S604, route characteristic information of the driver is set as an initial value of route selection. For example, in a case where there is a tendency to select a route with short parking time with reference to the memory recording the information, route characteristic information indicating the above is set. After the above, the processing proceeds to Step S605.

In Step S605, the initial value and the route candidate set in Step S603 or Step S604 are displayed on the input and output device 128 in a selectable manner.

In next Step S606, whether there is an instruction for route selection from the driver to the input and output device 128 is determined. The driver selects, for example, a route with short parking time or a route with a small number of times of turning back of a steering wheel from route candidates displayed on the input and output device 128. In a case where there is determined to be no instruction for route selection from the driver in Step S606, the processing proceeds to Step S607.

In Step S607, a route that matches with the initial value of route characteristic information set in Step S603 or S604 is set. In this manner, a route having the initial value that matches with route characteristic information of the driver can be set even if there is no instruction for route selection from the driver.

In a case where there is an instruction for route selection from the driver in Step S606, the processing proceeds to Step S608. In Step S608, route characteristic information of the route selected by the driver is recorded in a memory not shown. That is, route characteristic information showing whether the route selected by the driver is a route with short parking time or a route with a small number of times of turning back of a steering wheel is recorded in a memory.

In next Step S609, the route selected by the driver is set as a parking route. When a route is set in Step S609 or Step S607, the processing proceeds to Step S610.

In Step S610, whether there is a request from the driver to start automatic parking is determined. Specifically, whether or not the automatic parking start button 1205 shown in FIG. 12 is operated is determined. If there is a request to start automatic parking, the processing proceeds to Step S611, and automatic parking is started according to the route set in Step S609 or Step S607. If there is no request to start automatic parking, the processing returns to Step S606, and the route selection by the driver is repeated.

According to the second embodiment, in a case where there are a plurality of parking routes, information necessary for route selection can be appropriately provided to the driver. For this reason, parking that matches with the user's preference without causing driver's discomfort can be performed.

Third Embodiment

In a third embodiment, a configuration diagram of the vehicle 100 including the vehicle control device 124 equipped with the parking assistance device is similar to FIG. 1 described in the first embodiment, and illustration of the diagram is omitted. Furthermore, in the third embodiment, the block diagram of the vehicle control device 124 is similar to FIG. 2 described in the first embodiment, and illustration of the diagram is omitted.

Figure 16:
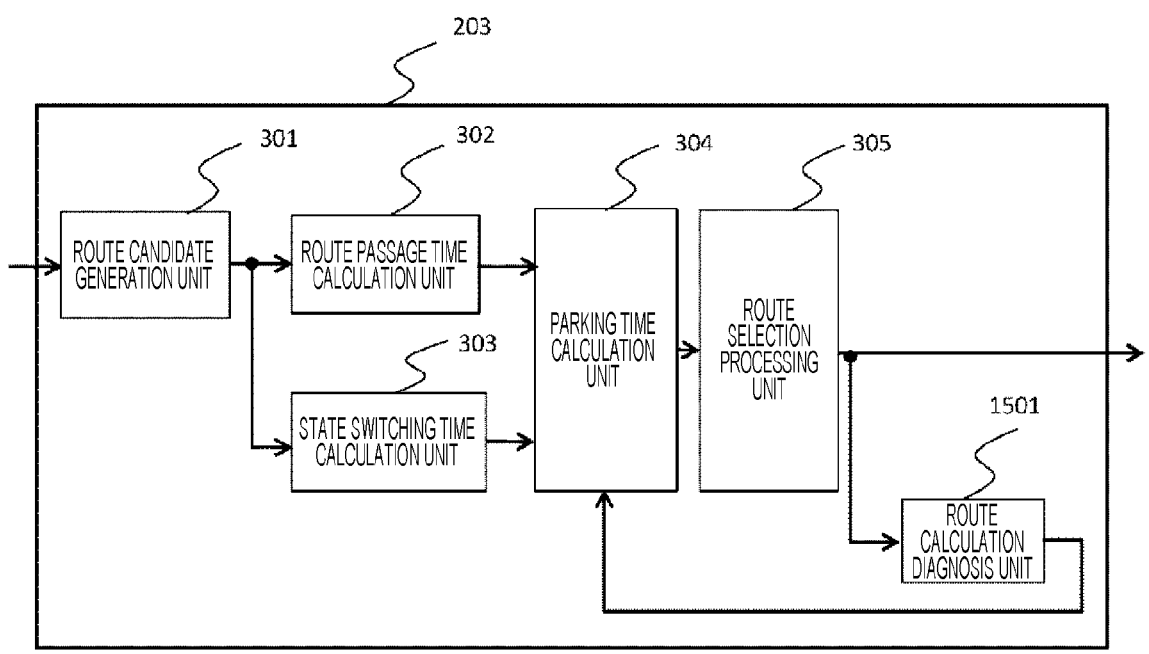
FIG. 16 is a detailed block diagram of the route generation unit according to a third embodiment.

FIG. 16 is a detailed block diagram of the route generation unit 203 in the third embodiment. In FIG. 16, the same portion as that of the route generation unit 203 shown in FIG. 3 described in the first embodiment is denoted by the same reference numeral, and description of the portion will be omitted. As shown in FIG. 16, the third embodiment has a configuration in which a route calculation diagnosis unit 1501 is newly provided. The route calculation diagnosis unit 1501 diagnoses whether route calculation is correctly performed.

As shown in FIG. 16, based on the route information selected by the route selection processing unit 305, the route calculation diagnosis unit 1501 compares route passage time and state switching time calculated in advance and route passage time and state switching time measured as the vehicle is actually parked. The route passage time and the state switching time will be described later. Then, when a difference of a predetermined value or more occurs between the route passage time and the state switching time calculated in advance and the route passage time and the state switching time required when the vehicle is actually parked, the route calculation is determined not to be correctly performed, and calculations of the parking time calculation unit 304 and others are stopped.

Here, when the route calculation is determined not to be correctly performed, the display relating to parking time and the like and the function relating to parking time may be invalidated. In a case where the function relating to parking time is temporarily invalidated, when the difference between the route passage time and the state switching time calculated in advance and the route passage time and the state switching time measured as the vehicle is actually parked becomes less than a predetermined value, the route calculation is determined to be correctly performed, and the display and the function relating to parking time are validated again. This makes it possible to ensure the reliability of the system.

Further, the route calculation diagnosis unit 1501 stops the route calculation diagnosis when the vehicle is actually parked and disturbance information is detected. Here, the disturbance information corresponds to a road gradient, a step, and a dynamic obstacle such as a person, a car, or the like. When there is a road gradient or a step, the speed is different from a speed calculated in advance, and diagnosis cannot be performed correctly. In view of the above, when a difference between an actually measured speed and a reference predetermined speed exceeds a threshold, the route calculation diagnosis is stopped. Similarly, when a person or the like enters the route, this needs to be detected and the vehicle needs to be stopped, and the speed becomes different from the speed calculated in advance. Accordingly, diagnosis cannot be performed correctly. In view of the above, when a difference between an actually measured speed and a reference predetermined speed exceeds a threshold, the route calculation diagnosis is stopped. In this manner, erroneous diagnosis of the route calculation diagnosis unit 1501 can be suppressed.

Figure 17:
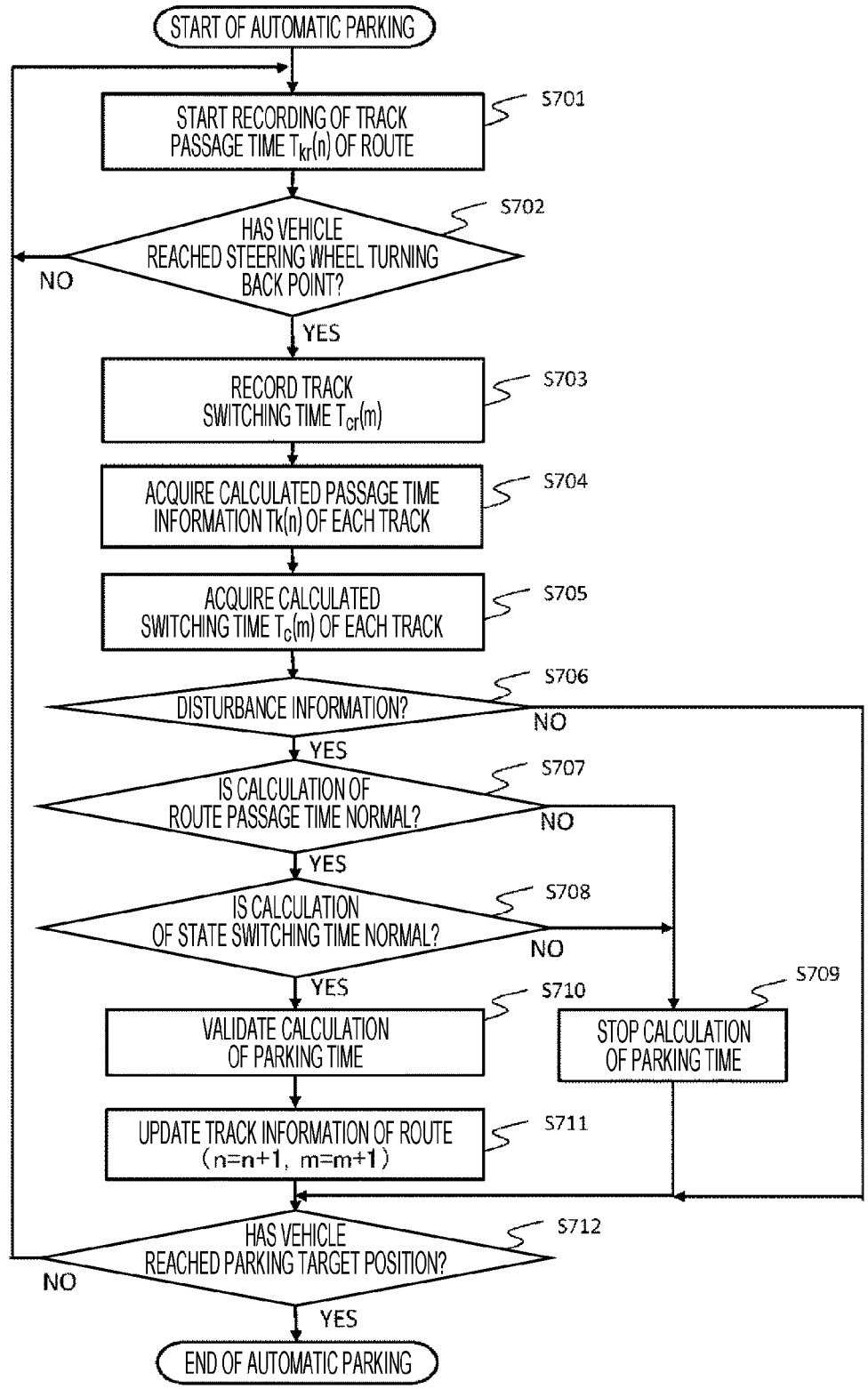
FIG. 17 is a flowchart showing processing operation of a route calculation diagnosis unit in the third embodiment.

FIG. 17 is a flowchart showing processing operation of the route calculation diagnosis unit 1501.

Note that a program shown in this flowchart can be executed by a computer including a CPU, a memory, and the like. All or part of the processing may be realized by a hard logic circuit. Furthermore, this program can be provided by being stored in a storage medium of the vehicle control device 124 (the route calculation diagnosis unit 1501) in advance. Alternatively, the program may be stored and provided on an independent recording medium, or the program may be recorded and stored on a storage medium of the vehicle control device 124 (the route calculation diagnosis unit 1501) via a network line. The program may also be supplied as a computer-readable computer program product in various forms, such as a data signal (carrier wave).

Figure 18:
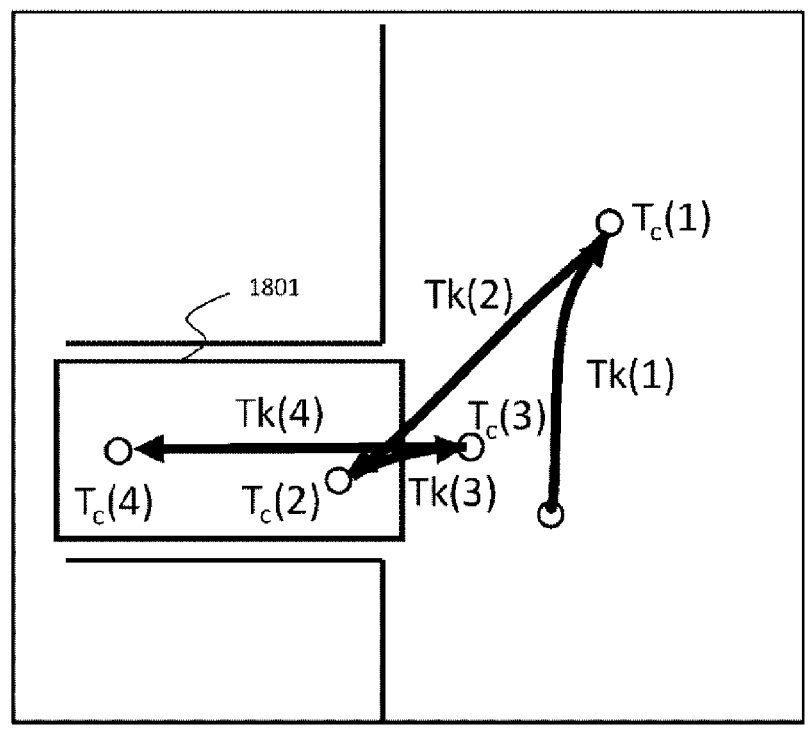
FIG. 18 is a diagram showing a route generated by the route generation unit according to the third embodiment.

When the automatic parking of the vehicle is started, recording of track passage time of a route is started in Step S701. Here, a track of a route will be described with reference to FIG. 18. FIG. 18 is a diagram showing an example of a route generated by the route generation unit 203. As shown in FIG. 18, route passage time to a parking target position 1801 is represented as a set of track passage times Tk(1), Tk(2), . . . , Tk(5). Furthermore, state switching time is represented as a set of track switching times Tc(1), Tc(2), . . . , Tc(5). These times are calculated by the route passage time calculation unit 302 and the state switching time calculation unit 303 of the route generation unit 203.

In Step S701 in FIG. 17, recording of track passage time $T_{kr}(n)$ during which the vehicle actually travels along the route is started. In the first processing of Step S701, recording of actual track passage time $T_{kr}(1)$ corresponding to track passage time Tk(1) is started.

In next Step S702, whether or not the vehicle has reached a steering wheel turning back point is determined. If the vehicle has not reached the steering wheel turning back point, the recording of the track passage time in Step S701 is continued. In a case where the vehicle has reached the steering wheel turning back point, the processing proceeds to Step S703.

In Step S703, a track switching time $T_{cr}(m)$ at which a steering wheel of the vehicle actually turns back is recorded. In first processing of Step S703, an actual track switching time $T_{cr}(1)$ corresponding to the track switching time Tc(1) is recorded.

In next Step S704, calculated passage time information $T_k(n)$ of each track is obtained. In the first processing of Step S704, passage time information $T_k(1)$ is obtained. In next Step S705, calculated switching time $T_c(m)$ of each track is obtained. In the first processing of Step S705, switching time $T_c(1)$ is obtained.

In next Step S706, whether or not there is disturbance information is determined. If there is disturbance information, the processing proceeds to Step S712 described below. If there is no disturbance information, the processing proceeds to Step S707.

In Step S707, in a case where a difference between the calculated passage time information Tk(n) of each track and the track passage time $T_{kr}(n)$ in which the vehicle actually travels is equal to or greater than a predetermined value, the calculation is determined not to be normal.

In next Step S708, the calculation is determined not to be normal in a case where a difference between the calculated switching time $T_c(m)$ of each track and the track switching time $T_{cr}(m)$ when a steering wheel of the vehicle is actually turned back is equal to or greater than a predetermined value.

In a case where the calculation is determined not to be normal in Step S707 or S708, the processing proceeds to Step S709. In Step S709, the calculation of the parking time calculation unit 304 of the route generation unit 203 is stopped, and the route display on the input and output device 128 is not performed. Furthermore, the selection of a route by the route selection processing unit is invalidated. Note that the route generation unit 203 may regenerate a parking route without stopping the calculation of the parking time calculation unit 304. In this manner, the improvement in the reliability of the automatic parking system can be ensured.

In a case where the calculation is determined to be normal in Step S707 and S708, the processing proceeds to Step S710. In Step S710, the calculation of the parking time calculation unit 304 of the route generation unit 203 is set to a valid state.

In next Step S711, track information of the route is updated. Specifically, information for calculating track passage time and track switching time is updated to information of a next track. Then, the processing proceeds to Step S712.

In Step S712, whether the vehicle has reached the parking target position 1801 is determined. If the vehicle has not reached, the processing returns to Step S701, and recording of track passage time $T_{pr}(n)$ during which the vehicle actually travels on a next track of the route is started.

According to the third embodiment, whether there is abnormality in the calculation of parking time can be diagnosed based on a threshold of time set in advance when the vehicle travels to a parking target position along a parking route including a steering wheel turning back route.

According to the embodiment described above, a function and an effect described below can be obtained.

(1) The parking assistance device mounted on the vehicle control device 124 includes the route candidate generation unit 301 that changes either one of a reference vehicle speed and a route shape when traveling on a route after a parking target position is selected and generates at least one or more routes from a parking start position to the parking target position, the route passage time calculation unit 302 that calculates the route passage time Td required to pass through the route generated by the route candidate generation unit 301, and the route selection processing unit 305 that selects a specific route from the generated routes, for example, a route with short parking time or a route with a small number of times of turning back, based on the route passage time Td. In this manner, when there are a plurality of parking routes, a route with short parking time or a route with a small number of times of turning back can be selected, and convenience of the user is improved.

(2) The parking assistance device according to (1) further includes the state switching time calculation unit 303 that calculates the state switching time Ts required for switching between forward and backward movements of the vehicle, and the route selection processing unit 305 calculates the parking time Tp based on the route passage time Td and the state switching time Ts. Accordingly, as compared with a case where time determined based simply on a route length and a vehicle speed is presented, the user can select a parking route based on time required by automatic parking.

(3) The route candidate generation unit 301 of the parking assistance device described in (1) or (2) sets the reference vehicle speed to be smaller as a road width is narrower or as a distance from an obstacle is shorter. In this manner, the user can select a parking route based on required automatic parking time that is close to actual parking time, as compared to a case where parking time is calculated based on a standard vehicle speed and presented.

(4) The route candidate generation unit 301 of the parking assistance device described in (3) includes the switching unit 3011 that sets a reference vehicle speed to be smaller as a road width is narrower or as a distance from an obstacle is shorter.

(5) The route candidate generation unit 301 of the parking assistance device described in (1) or (2) sets the reference vehicle speed to be smaller as the surrounding environment is darker or as an amount of rainfall is larger. In this manner, a route candidate can be presented to the user by detailed calculation performed in accordance with a surrounding environment and a rainfall amount.

(6) The route candidate generation unit 301 of the parking assistance device described in (1) or (2) sets the reference vehicle speed to be smaller for backward movement than for forward movement. In this manner, the possibility of causing the user's discomfort at the time of backward movement is reduced.

(7) The route candidate generation unit 301 of the parking assistance device described in (1) or (2) sets the reference vehicle speed to be smaller as the curvature of a traveling route is larger. In this manner, in a case where there are a plurality of parking routes, parking time according to the curvature of a traveling route is calculated, and the user can select one from highly accurate parking time.

(8) The route candidate generation unit 301 of the parking assistance device according to (1) or (2) generates a route with at least one or more of route shapes of one-side steering and S-shaped steering at the curvature set the route shapes to a radius equal to or greater than a minimum radius. In this manner, a parking route shape can be generated by a route with short parking time.

(9) The route candidate generation unit 301 of the parking assistance device according to (8) sets the S-shaped steering to have a first turn and a last turn with radii of a common size, or the first turn and the last turn with radii of different sizes.

(10) The route passage time calculation unit 302 of the parking assistance device according to (1) or (2) sequentially calculates vehicle speeds in consideration of either one of acceleration and a jerk based on the reference vehicle speed, and calculates the vehicle passage time based on the calculated vehicle speed and a length of the generated route. In this manner, a parking route with improved ride comfort when the vehicle speed changes can be presented.

(11) The state switching time calculation unit 303 of the parking assistance device according to (2) calculates the state switching time based on at least one or more of switching time between forward and backward movements that occurs while the vehicle is stopped and steering-without-driving time in which a steering angle is changed while the vehicle is stopped. In this manner, highly accurate parking time can be presented to the user.

(12) The route selection processing unit 305 of the parking assistance device described in (2) calculates the parking time Tp obtained by adding the route passage time Td and the state switching time Ts, and selects a route with the calculated parking time Tp that is short as a specific route. In this manner, a parking route that is calculated with highly accurate parking time can be presented to the user.

(13) The route selection processing unit 305 of the parking assistance device described in (2) calculates the parking time Tp obtained by adding the route passage time Td and the state switching time Ts, and selects a route in which the route passage time Td is larger than the state switching time Ts as the specific route for a route in which a difference in the parking time Tp is equal to or less than a predetermined value among the generated routes. In this manner, in a case where there are a plurality of parking routes, a parking route determined with reference to a route in which a driving state is switched, such as turning back of a steering wheel, can be selected.

(14) The route selection processing unit 305 of the parking assistance device described in (2) calculates the parking time Tp obtained by adding the route passage time Td and the state switching time Ts, and selects a route having a short length as the specific route for a route in which a difference in the parking time Tp is equal to or less than a predetermined value among the generated routes. In this manner, in a case where there are a plurality of parking routes, a route having a short route length can be selected.

(15) The parking assistance device according to (2) further includes the input and output device 128 that presents information to the driver. The input and output device 128 presents at least one or more pieces of information on the parking time Tp calculated based on the route passage time Td and the state switching time Ts, the number of times of turning back of a steering wheel of the vehicle, and a route of the vehicle. In this manner, in a case where there are a plurality of parking routes, necessary information can be presented.

(16) The input and output device 128 of the parking assistance device according to (15) presents a first route with a smallest number of times of turning back of a steering wheel of the vehicle, or a second route with shortest parking time, and furthermore, in a case where only either one of start of forward movement and start of backward movement of the vehicle is displayed for the first route or the second route, a third route with shortest parking time in the other one that is not displayed. In this manner, in a case where there are a plurality of parking routes, necessary information can be presented.

(17) The parking assistance device according to (15) further includes the driver-selected route storage unit 1102 that stores a route selected by the driver. The driver-selected route storage unit 1102 records the number of times a first route with a smallest number of times of turning back of a steering wheel is selected and the number of times a second route with the parking time that is shortest is selected, and presents a route that is selected a large number of times to the driver as an initially-set route. In this manner, in a case where there are a plurality of parking routes, necessary information can be presented.

(18) The parking assistance device according to (2) further includes the route calculation diagnosis unit 1501 that diagnoses whether the route calculation is correctly performed. The route calculation diagnosis unit 1501 measures the track passage time $T_{kr}(n)$ corresponding to route passage time and the track switching time $T_{cr}(m)$ corresponding to state switching time after parking of the vehicle is started, and determines that the route calculation is abnormal in a case where a difference between the passage time information Tk(n) showing the route passage time calculated by the route passage time calculation unit 302 and the measured track passage time $T_{kr}(n)$ is equal to or greater than a first predetermined value, or in a case where a difference between the switching time $T_c(m)$ showing state switching time calculated by the state switching time calculation unit 303 and the measured track switching time $T_{cr}(m)$ is equal to or greater than a second predetermined value. In this manner, whether there is abnormality in the calculation of a route can be diagnosed.

(19) The route calculation diagnosis unit 1501 of the parking assistance device described in (18) invalidates the selection of a specific route performed by the route selection processing unit 305 in a case where the route calculation is determined to be abnormal. In this manner, in a case where the calculation of a route is abnormal, the route selection can be invalidated.

(20) In a state where the selection of the specific route performed by the route selection processing unit 305 is invalid, the route calculation diagnosis unit 1501 of the parking assistance device according to (19) validates the selection of the specific route performed by the route selection processing unit in a case where a difference between the passage time information $T_k(n)$ showing the route passage time calculated by the route passage time calculation unit 302 and the measured track passage time $T_{kr}(n)$ is less than the first predetermined value, and a difference between the switching time $T_c(m)$ showing the state switching time calculated by the state switching time calculation unit 303 and the measured track switching time $T_{cr}(m)$ is less than the second predetermined value. In this manner, in a case where the calculation of a route returns to normal, the route selection can be validated.

(21) The route calculation diagnosis unit 1501 of the parking assistance device described in (18) does not perform the diagnosis of the route calculation in a case where predetermined disturbance information is detected after parking of the vehicle is started. In this manner, the diagnosis can be invalidated in a case where there is disturbance information.

(22) The route calculation diagnosis unit 1501 of the parking assistance device described in (21) detects at least one of a road gradient, a step, a dynamic obstacle such as a person and a car as the disturbance information. In this manner, the diagnosis can be invalidated in a case where there is disturbance information.

(Modification)

The present invention can be implemented after the above-described embodiment is modified as described below.

(1) The route selection processing unit 305 calculates parking time Tp obtained by adding the route passage time Td and the state switching time Ts, and selects a route with short calculated parking time Tp as a specific route. However, the route selection processing unit 305 may obtain the route passage time Td, and select a route with short calculated route passage time Td as a specific route.

The present invention is not limited to the above-described embodiment, and other forms conceivable within the scope of the technical idea of the present invention are also included in the scope of the present invention as long as the characteristics of the present invention are not impaired. Further, a configuration in which the above-described embodiment and a plurality of modified examples are combined may be employed.

REFERENCE SIGNS LIST

100 Vehicle
110 Driving force generation mechanism
111 Brake
112 Transmission
113 Steering wheel
114 Wheel
120 Driving force control device
121 Brake control device
122 Steering control device
123 Transmission control device
124 Vehicle control device
125 Surrounding situation recognition sensor
126 Vehicle speed sensor
201 Parking target candidate presentation unit
202 Self-position estimation unit
203 Route generation unit
204 Target steering angle calculation unit
205 Target vehicle speed calculation unit
206 Target braking and driving force calculation unit
207 Forward and backward movement switching determination unit
301 Route candidate generation unit
302 Route passage time calculation unit
303 State switching time calculation unit
304 Parking time calculation unit
305 Route selection processing unit
1101 Display route selection processing unit
1102 Driver-selected route storage unit
1501 Route calculation diagnosis unit

The invention claimed is:

1. A parking assistance device, comprising:
at least one processor configured to:
change either one of a reference vehicle speed and a route shape when traveling on a route after a parking target position is selected and generate at least one or more routes from a parking start position to the parking target position;
calculate route passage time required to pass through the route generated by the at least one processor;
select a specific route from the generated routes based on the route passage time;
calculate state switching time required for switching between forward and backward movements of a vehicle;
wherein the specific route is selected based on the route passage time and the state switching time;
diagnose whether route calculation is correctly performed;
measure the route passage time and the state switching time after parking of the vehicle is started;
determine that the route calculation is abnormal in a case where a difference between the route passage time calculated and the measured route passage time is equal to or greater than a first predetermined value, or in a case where a difference between the state switching time calculated and the measured state switching time is equal to or greater than a second predetermined value; and
control the vehicle based on the selected specific route.

2. The parking assistance device according to claim 1, wherein the at least one processor further configured to:
set the reference vehicle speed to be smaller as a road width is narrower or as a distance to an obstacle is shorter.

3. The parking assistance device according to claim 1, wherein the at least one processor further configured to:
set the reference vehicle speed to be smaller as a surrounding environment is darker or as an amount of rainfall is larger.

4. The parking assistance device according to claim 1, wherein the at least one processor further configured to:
set the reference vehicle speed to be smaller for backward movement than for forward movement.

5. The parking assistance device according to claim 1, wherein the at least one processor further configured to:
set the reference vehicle speed to be smaller as curvature of a traveling route is larger.

6. The parking assistance device according to claim 1, wherein the at least one processor further configured to:
generate a route with at least one route shape of one-side steering and S-shaped steering at curvature set to a radius equal to or greater than a minimum radius.

7. The parking assistance device according to claim 6, wherein the at least one processor further configured to:
set the S-shaped steering to have a first turn and a last turn with radii of a common size, or the first turn and the last turn with radii of different sizes.

8. The parking assistance device according to claim 1, wherein the at least one processor further configured to:
sequentially calculate vehicle speeds in consideration of either one of acceleration and a jerk based on the reference vehicle speed, and calculate the vehicle passage time based on the calculated vehicle speed and a length of the route.

9. The parking assistance device according to claim 1, wherein the at least one processor further configured to:
calculate parking time obtained by adding the route passage time and the state switching time, and select a route with the calculated parking time that is a shortest route.

10. The parking assistance device according to claim 1, wherein the at least one processor further configured to:
calculate parking time obtained by adding the route passage time and the state switching time, and select a route in which the route passage time is larger than the state switching time as the specific route for a route in which a difference in another parking time is equal to or less than a predetermined value among the generated routes.

11. The parking assistance device according to claim 1, wherein the at least one processor further configured to:
calculate parking time obtained by adding the route passage time and the state switching time, and select a shortest route as the specific route for a route in which a difference in another parking time is equal to or less than a predetermined value among the generated routes.

12. The parking assistance device according to claim 1, further comprising a display for a driver, wherein
the display is configured to present at least one or more pieces of information on parking time calculated based on the route passage time and the state switching time, the number of times of turning back of a steering wheel of the vehicle, and the specific route.

13. The parking assistance device according to claim 12, wherein
the display is configured to present a first route with a smallest number of times of turning back of a steering wheel, or a second route with shortest parking time, and furthermore, in a case where only either one of start of forward movement and start of backward movement of the vehicle is displayed for the first route or the second route, a third route with shortest parking time in the other one that is not displayed.

14. The parking assistance device according to claim 12, further comprising a driver-selected route storage that stores a route selected by a driver, wherein
the driver-selected route storage records the number of times a first route with a smallest number of times of turning back of a steering wheel is selected and the number of times a second route with the parking time that is shortest is selected, and presents a route that is selected a large number of times to the driver as an initially-set route.

15. The parking assistance device according to claim 1, wherein the at least one processor further configured to:
invalidate the selection of the specific route performed by in a case where the route calculation is determined to be abnormal.

16. The parking assistance device according to claim 15, wherein the at least one processor further configured to:
in a state where the selection of the specific route performed is invalid, validate the selection of the specific route performed in a case where a difference between the route passage time calculated and the measured route passage time is less than the first predetermined value, and a difference between the state switching time calculated and the measured state switching time is less than the second predetermined value.

17. The parking assistance device according to claim 1, wherein the at least one processor further configured to:
not perform the diagnosis of the route calculation in a case where predetermined disturbance information is detected after parking of the vehicle is started.

18. The parking assistance device according to claim 17, wherein the at least one processor further configured to:
detect at least one of a road gradient, a step, or a dynamic obstacle as the disturbance information.

* * * * *